United States Patent
Shalom

(10) Patent No.: US 9,635,884 B2
(45) Date of Patent: May 2, 2017

(54) HERB GRINDER

(71) Applicant: Elad Shalom, Giv'atayim (IL)

(72) Inventor: Elad Shalom, Giv'atayim (IL)

(*) Notice: Subject to any disclaimer, the term of this patent is extended or adjusted under 35 U.S.C. 154(b) by 0 days.

(21) Appl. No.: 15/077,572

(22) Filed: Mar. 22, 2016

(65) Prior Publication Data

US 2016/0278430 A1 Sep. 29, 2016

(30) Foreign Application Priority Data

Mar. 23, 2015 (IL) .......................................... 237901

(51) Int. Cl.
*A47J 42/34* (2006.01)
*A24F 17/00* (2006.01)

(52) U.S. Cl.
CPC ............... *A24F 17/00* (2013.01); *A47J 42/34* (2013.01)

(58) Field of Classification Search
CPC .................................. A47J 42/34; A24F 17/00
USPC .............................................. 241/168–169.2
See application file for complete search history.

(56) References Cited

U.S. PATENT DOCUMENTS

| 3,949,947 | A | 4/1976 | Youngquist et al. |
|---|---|---|---|
| 4,304,363 | A | 12/1981 | Atkielski |
| 8,584,842 | B2 | 11/2013 | Fakhouri et al. |
| 2012/0097774 | A1 | 4/2012 | Hainbach |
| 2013/0025608 | A1 | 1/2013 | Fakhouri et al. |

FOREIGN PATENT DOCUMENTS

| CN | 203018163 | 6/2013 |
|---|---|---|
| EP | 2433511 | 3/2012 |
| GB | 2356797 | 6/2001 |
| NL | 1019269 | 5/2002 |
| WO | 01/11995 | 2/2001 |
| WO | 2009/018947 | 2/2009 |
| WO | WO 2013/062974 | 5/2013 |
| WO | WO2013062974 | 5/2013 |

OTHER PUBLICATIONS

European Search Report for European Application No. EP16161864 completed on Jan. 11, 2017.

*Primary Examiner* — Mark Rosenbaum
(74) *Attorney, Agent, or Firm* — Dorsey & Whitney LLP

(57) ABSTRACT

An herb grinder has a longitudinal dimension and comprises a grinding assembly having a grinding compartment for grinding herbs placed therein, and a longitudinal storage compartment different the grinding compartment. The longitudinal storage compartment can extend along the longitudinal dimension of the grinder along a constant length, which is greater than that of the grinding compartment and which is such as to allow the storage compartment to store therein an accessory of a corresponding length. Alternatively or in addition, the storage compartment can comprise hollow cavity configured to hold therein a roll of rolling paper having a free end, and a longitudinal slot extending along the cavity and connecting an interior of the hollow cavity with its exterior exposed to a user so as to allow the free end of the rolling paper to pass through and project outwardly from the longitudinal slot, allowing removal of a desired amount of rolling paper by the user.

20 Claims, 19 Drawing Sheets

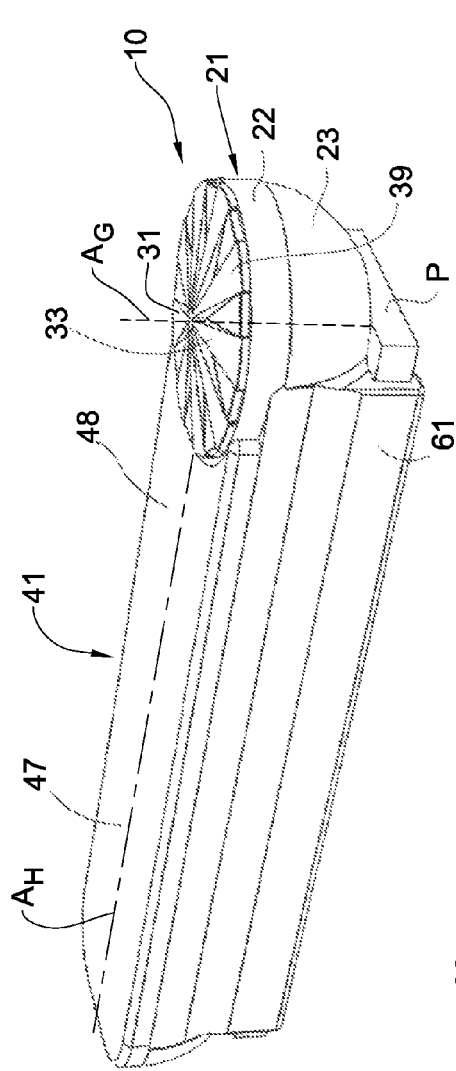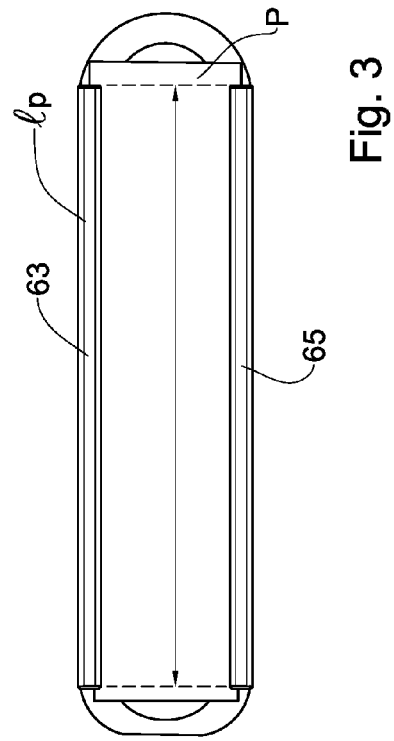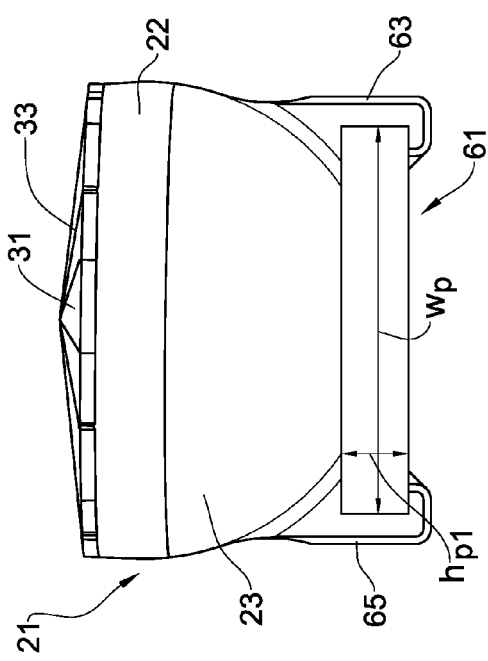
Fig. 1
Fig. 2
Fig. 3

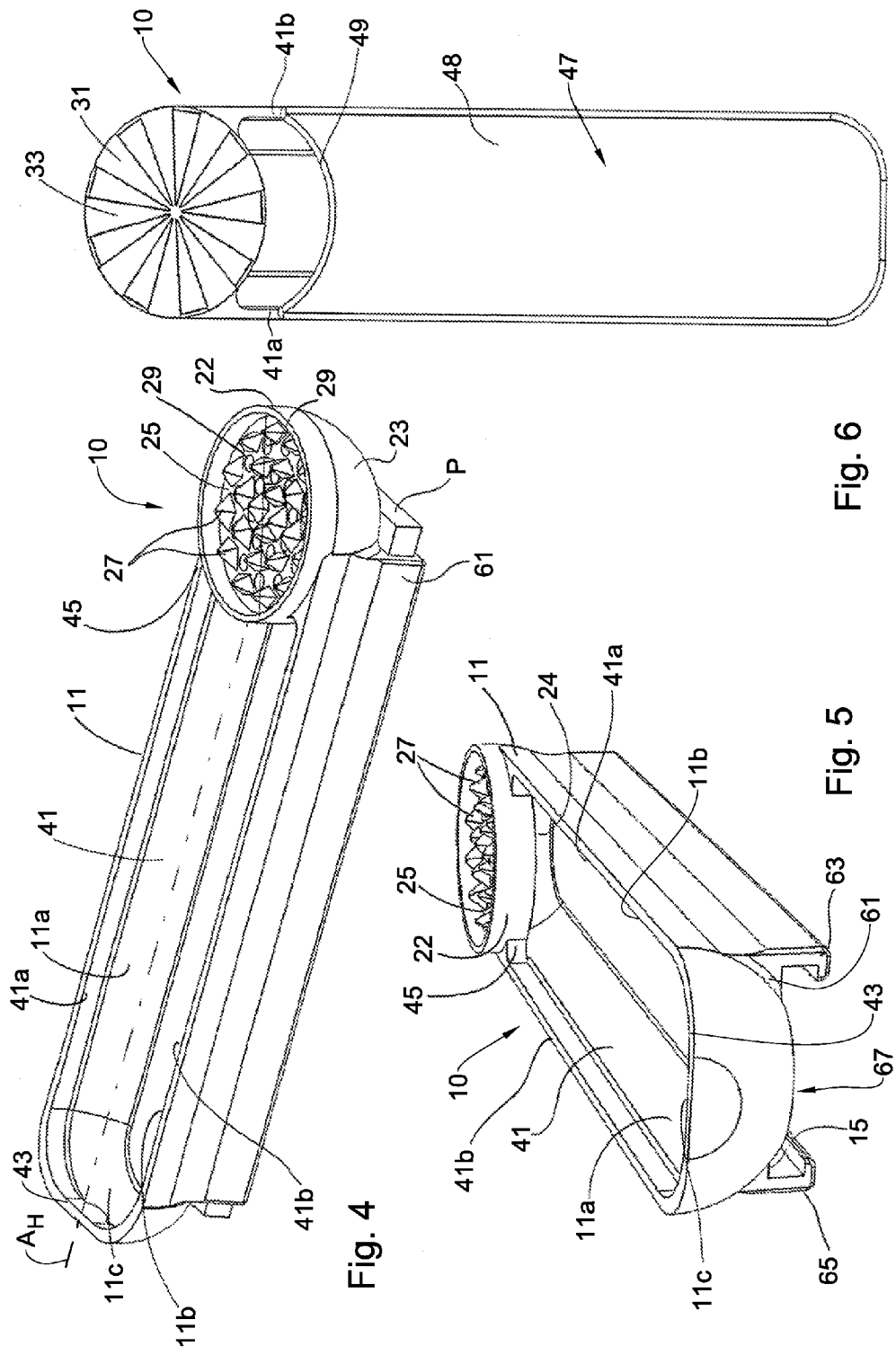

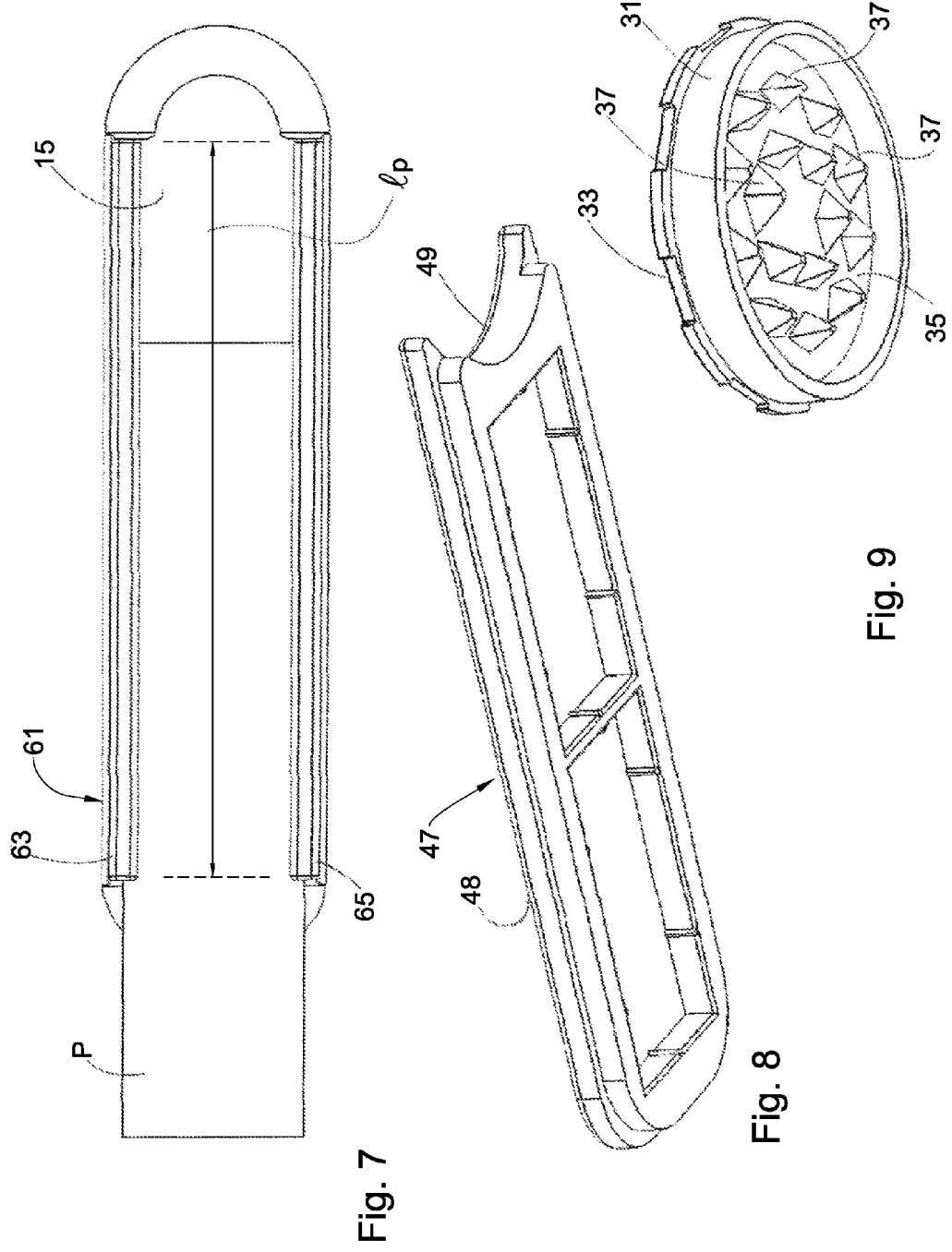

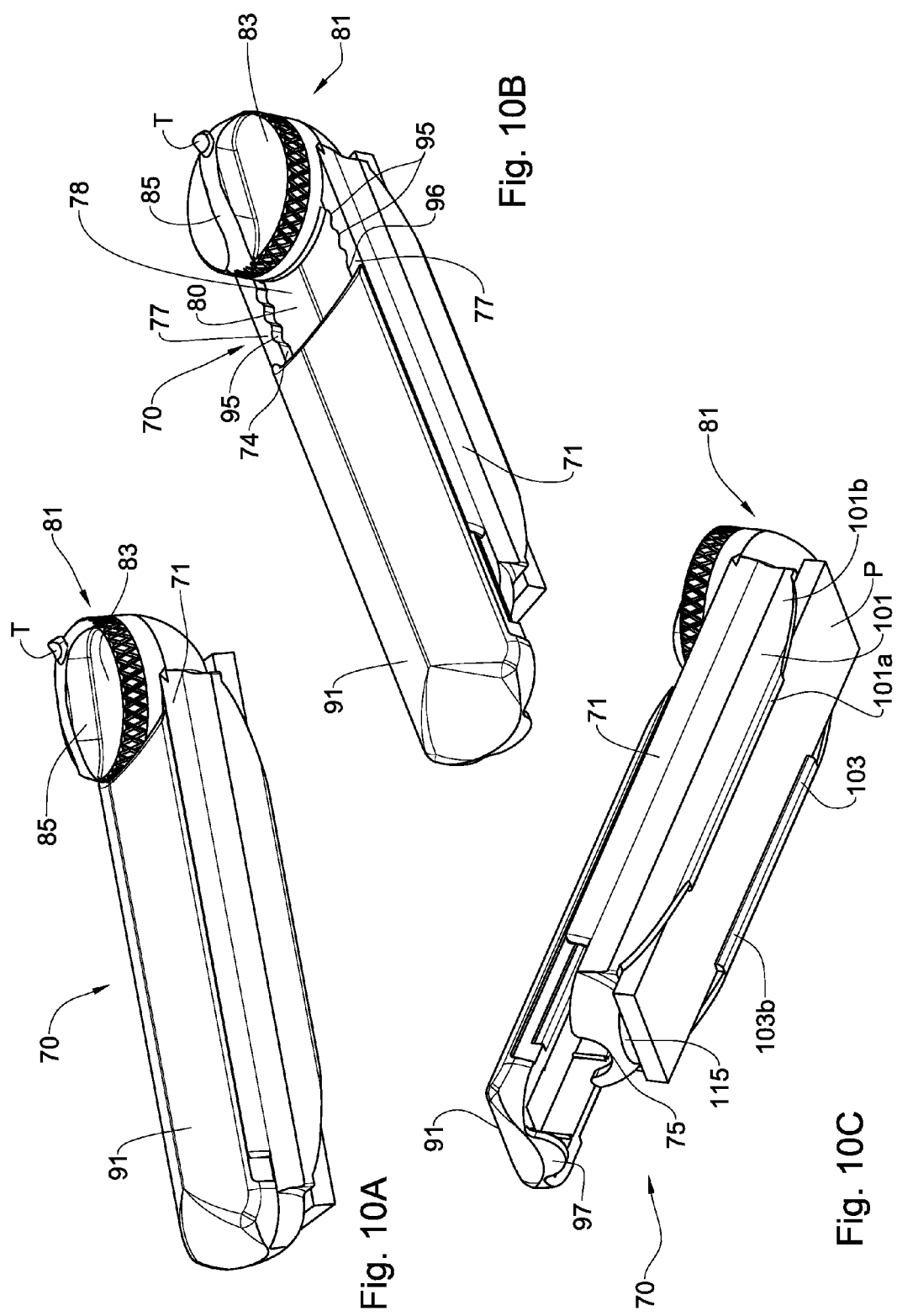

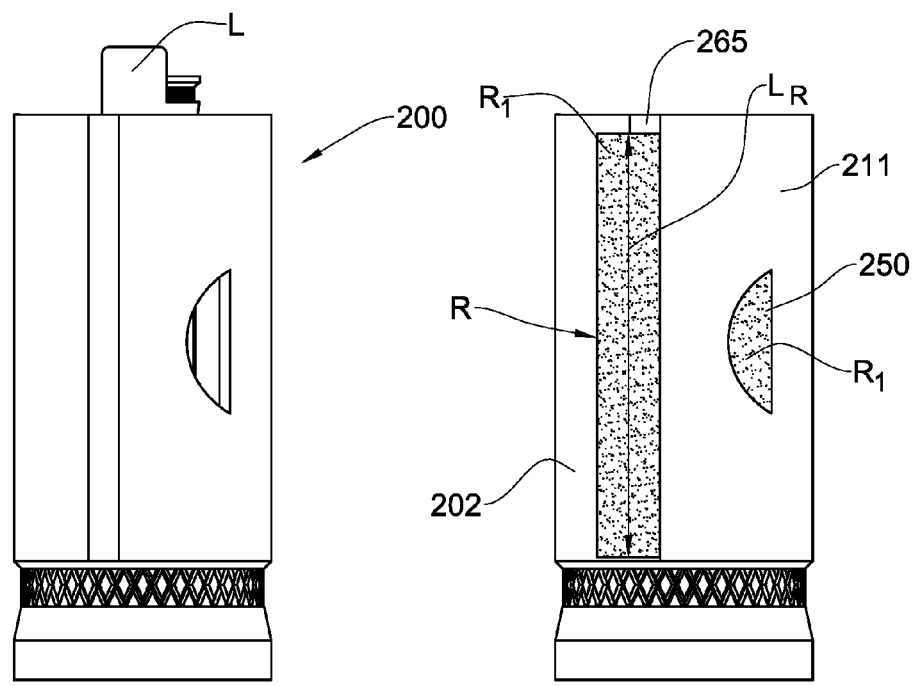
Fig. 20B                    Fig. 20C
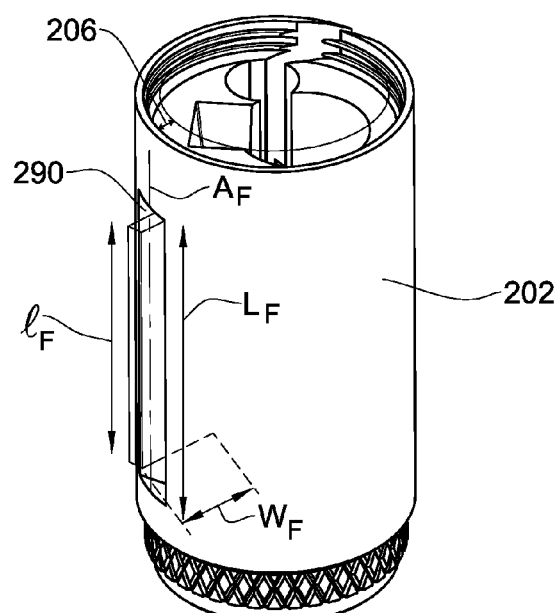
Fig. 20D

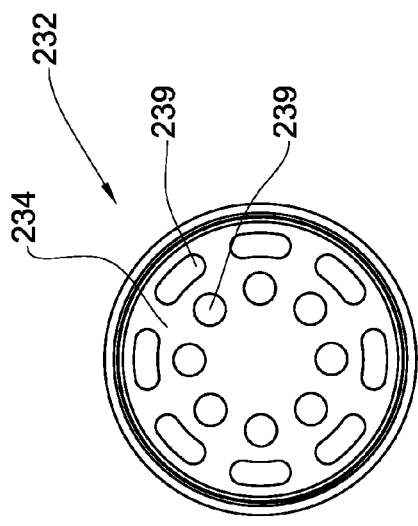
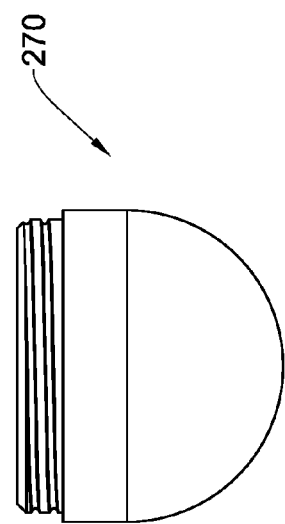
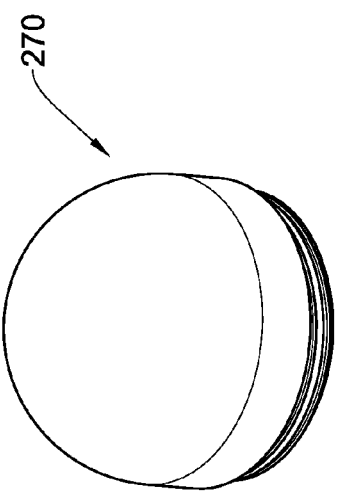
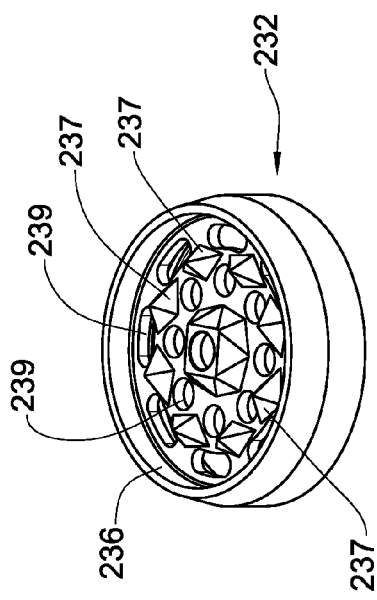
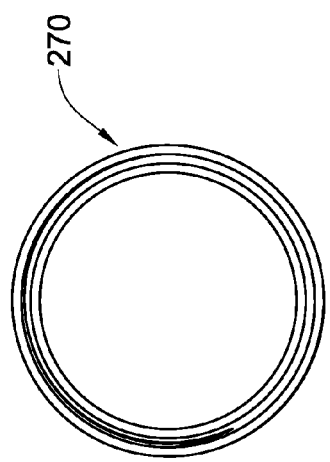

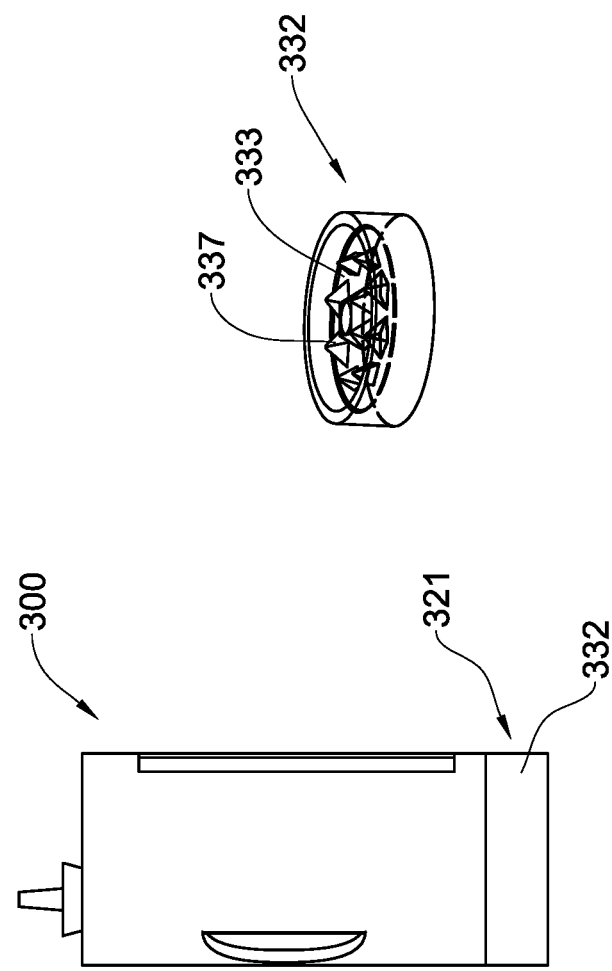

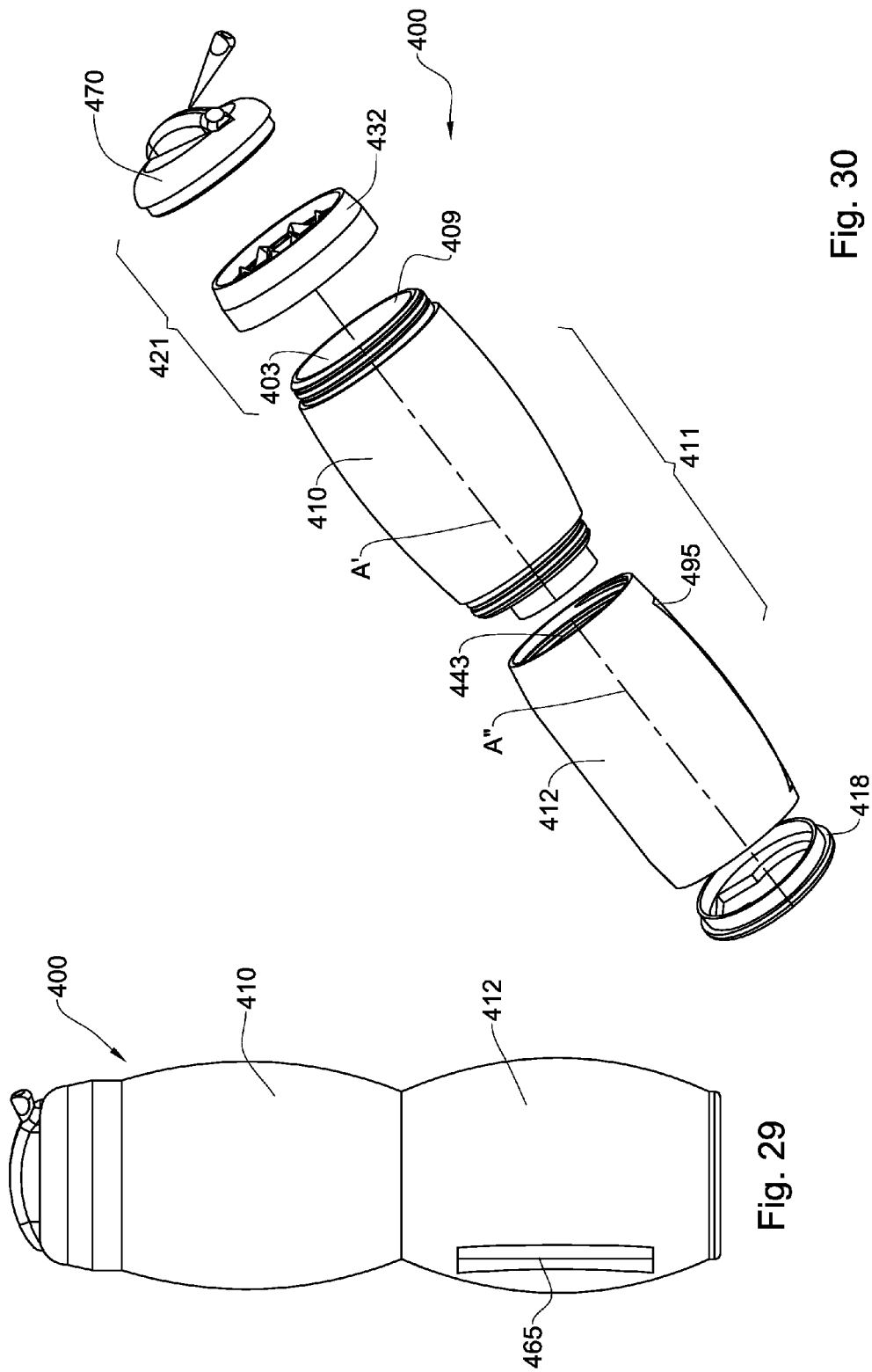

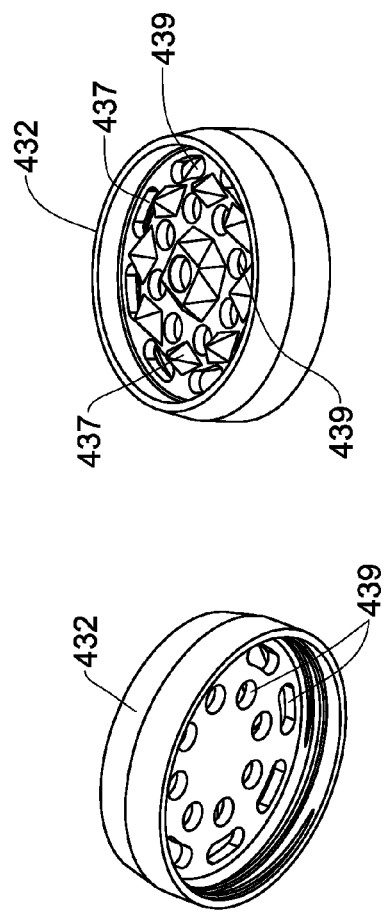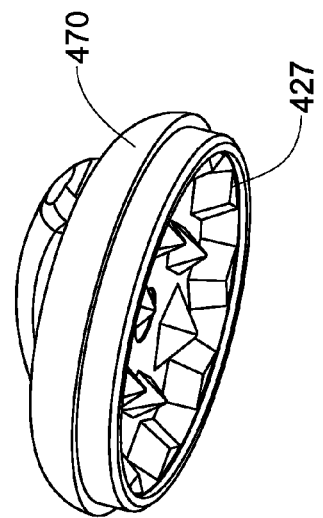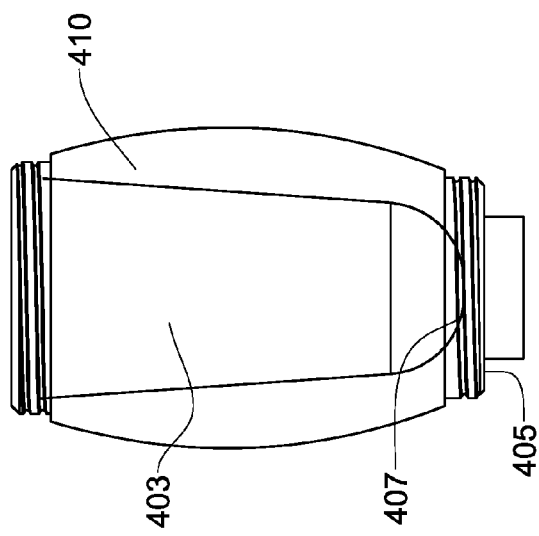

US 9,635,884 B2

HERB GRINDER

TECHNOLOGICAL FIELD

The presently disclosed subject matter is in the field of herb grinders, and more specifically herb grinders that are combined with related accessories.

BACKGROUND

Herb grinders are well known and are in use for different purposes, and at different configurations.

Herb grinders for personal use are relatively small and usually comprise at least a grinding mechanism for grinding herbs and a compartment for collecting the ground herbs.

WO 2013/062974 discloses a combined herb storage, grinder and pouring container, which includes a grinding and pouring cup having grinding elements and a compartment for storing herbs to be ground.

U.S. Pat. No. 8,584,842 discloses a storage receptacle for smoking material may open on two opposite sides, with a bottom end of the storage receptacle which may have a first cavity which may store the smoking material.

GENERAL DESCRIPTION

The present application is directed to an herb grinder configured for carrying therewith at least one accessory required for using ground herbs, such as a rolling paper, filter tips or a lighter.

In accordance with one example of the presently disclosed subject matter there is provided a herb grinder comprising a grinding assembly having at least a grinding compartment for grinding herbs placed therein; a longitudinal storage compartment comprising a longitudinal slot extending at least along the majority thereof allowing a direct access to at least a part of an accessory stored therein.

In accordance with another example of the presently disclosed subject matter there is provided a herb grinder comprising a grinding assembly having at least a grinding compartment for grinding herbs placed therein; a longitudinal storage compartment different from the grinding compartment and having a length corresponding to a length of a package of a rolling paper to be stored within the storage compartment and to be used with ground herbs.

In accordance with another example of the presently disclosed subject matter there is provided a herb grinder comprising: a grinding assembly having at least a grinding compartment for grinding herbs placed therein, the grinding compartment having a central axis; a longitudinal compartment different from said grinding compartment having a longitudinal axis substantially perpendicular to the central axis of said grinding compartment.

In accordance with another example of the presently disclosed subject matter there is provided a herb grinder comprising: a grinding assembly having at least a grinding compartment for grinding herbs placed therein; a storage compartment different from said grinding compartment; and a cover configured for both covering said storage compartment and said grinding compartment for forming with at least one of said grinding compartment or said storage compartment a closed mixing compartment for mixing at least herbs ground in the grinding compartment.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 1 is a side perspective view of an herb grinder in accordance with one example of the presently disclosed subject matter, with an accessory P disposed in its storage compartment, and with covers covering its corresponding grinder and mixing compartments;

FIG. 2 is a front end view of the herb grinder of FIG. 1;

FIG. 3 is a bottom view of the herb grinder of FIG. 1;

FIG. 4 is a perspective view of the herb grinder of FIG. 1, without the cover of the grinding compartment and the cover of the mixing compartment;

FIG. 5 is a rear perspective view of the herb grinder of FIG. 4;

FIG. 6 is a top view of the herb grinder of FIG. 1, comprising a sliding cover (different from that of FIG. 8) with the mixing compartment slightly open;

FIG. 7 is a bottom view of the herb grinder of FIG. 1, with the accessory P partially removed from the storage compartment;

FIG. 8 is a bottom perspective view of the cover of the mixing compartment of the herb grinder of FIG. 1;

FIG. 9 is a bottom perspective view of the cover of the grinding compartment of the herb grinder of FIG. 1;

FIGS. 10A to 10C show a herb grinder in accordance with another example of the presently disclosed subject matter, with an accessory P disposed in its storage compartment, and with covers covering its corresponding grinding and mixing compartments;

FIG. 20B is a front view of the herb grinder of FIG. 16A with the lighter of FIG. 20A stored therein and its cap removed therefrom;

FIG. 20C is a front view of the herb grinder of FIG. 16A with a roll of rolling paper stored therein and its cap removed therefrom;

FIG. 20D shows the herb grinder of FIG. 17A with filter tips stored therein;

FIGS. 21A to 21C show isometric, bottom and side views, respectively, of the cap of the herb grinder of FIG. 16A;

FIG. 22 is a top perspective view of a teeth element of the herb grinder of FIG. 16A;

FIG. 23 is a bottom view of the teeth element of the herb grinder of FIG. 16A;

FIG. 27 is a front view of an herb grinder in accordance with another example of the presently disclosed subject matter;

FIG. 28 is a front perspective view of a teeth element of the herb grinder of FIG. 27;

FIG. 29 is a front view of an herb grinder in accordance with another example of the presently disclosed subject matter;

FIG. 30 is an exploded view of the herb grinder of FIG. 29;

FIG. 36 is a schematic front view of the first body of FIG. 34, showing an interior thereof;

FIGS. 37A and 37B are bottom and top perspective views, respectively, of a teeth element of the herb grinder of FIG. 29;

FIG. 38 is a bottom perspective view of a cap of the herb grinder of FIG. 29;

DETAILED DESCRIPTION OF EMBODIMENTS

Figure 11:
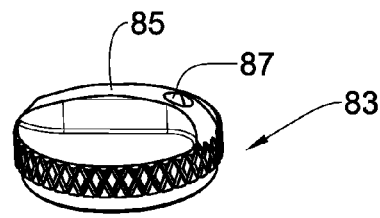
FIG. 11 is a top perspective view of the cover of the grinding compartment of the herb grinder of FIGS. 10A to 10C.

Described below are examples of herb grinders, in accordance with the presently disclosed subject matter, each provided with a capability of carrying at least a package of a rolling paper. Since such packages can normally have either a planar or a cylindrical configuration, described below with reference to FIGS. 1 to 15 are examples of planar-type herb grinders, and with reference to FIGS. 16 to 38 are examples of cylindrical-type herb grinders. FIGS. 1 to 9 show one example of a planar-type herb grinder designated as 10, which is configured for carrying therewith a planar package of a rolling paper P (seen in FIGS. 1 to 4).

The herb grinder 10 comprises a longitudinal body 11 which has a longitudinal axis $A_H$ (shown in FIGS. 1 and 4) and comprising: a grinding chamber 23, which when covered by a corresponding cover 31 forms a grinding compartment 21; a mixing chamber 40, which when covered by a corresponding cover 47 forms a mixing compartment 41, and a storage compartment 61 disposed at the side of the mixing chamber 40 opposite the cover 47. The grinding chamber 23, the mixing chamber 40 and the storage compartment 61 can all be formed as a unitary body or rather can be in the form of separately manufactured components integrally assembled together.

The grinding chamber 23 has an exterior surface 24 and an interior 26 (FIGS. 4 and 5) a bottom portion of which has a form of a bowel, configured to be covered by the cover 31 with a possibility of being rotated relative thereto about their common axis $A_G$ (FIG. 1), which is perpendicular to the longitudinal axis $A_H$ of the grinder body 11. It should be mentioned that the grinding compartment 21 can have such an orientation that its axis $A_G$ forms an acute or obtuse angle with the axis $A_H$.

The interior of the grinding chamber 23 is defined by its bottom wall 25 surrounded by a side wall 28 (FIGS. 4 and 5). The grinder body 11 is so formed that at least a part of the chamber 23 overhangs interior 46 of the mixing chamber 40 (FIGS. 4 and 5). A bottom wall 25 of the chamber 23 (constituting a bottom surface of the grinding compartment when covered by the cover 31) comprises a plurality of grinding teeth 27 protruding upwardly therefrom and arranged in a spatial pattern of circular rows disposed at different radial distances from the axis $A_G$ and radially spaced from each other by areas of the bottom wall 25. The bottom wall 25 further comprises a plurality of openings 29 (FIG. 4) extending from the surface 25 of the chamber 23 to the interior of the mixing chamber 40 such the ground herbs from the grinding compartment 21 can pass via the openings 29 into the mixing chamber 40. The bottom wall 25 of the chamber 23 and the teeth 27 constitute together a teeth portion 22 and can constitute a unitarily formed part of the grinding chamber 23, or alternatively, can be fixedly attached thereto.

The grinding cover 31 (shown in FIGS. 1, 2 and 9 has an outer surface 33 and an inner surface 35 (FIG. 9) the latter having a plurality of grinding teeth 37 protruding therefrom and arranged in a spatial pattern of circular rows disposed at radial distances from the axis $A_G$ corresponding to those of the areas between the teeth 27 of the bottom wall 25 such that, when the grinding cover 31 covers the chamber 23 (FIGS. 1 and 2), the grinding teeth 37 of the cover 31 are received between the circular rows of the grinding teeth 27 of the chamber 23.

In operation, once herbs to be ground have been placed within the chamber 23, the cover 31 has been forcedly attached to the chamber 23 and rotated relative thereto by a user, the herbs are ground between the teeth 27 and 37 and the ground herbs pass through the openings 29 into the mixing compartment 21.

The outer surface 33 of the cover 31 is formed with gripping protrusions 39 (FIG. 1) for facilitating holding the cover by the user during its location. Alternatively, the cover 31 may have a single gripping member or any other gripping means allowing securely holding the cover during the rotation thereof with respect to the chamber 23.

The mixing chamber 40 (best seen in FIGS. 4 and 5) extends along the majority of the grinder body 11 and the mixing chamber cover 47 (FIGS. 1 and 8) is configured to be fitted at the top of the mixing chamber constituting together a closed mixing compartment 41.

The mixing chamber 40 has a bottom 13, side walls 11a and 11b extending between its distal end 43 associated with a distal end wall 11c of the mixing chamber and its proximal end 45 associated with the grinding chamber 23. The side walls 11a and 11b of the mixing chamber merge with the exterior surface 24 of the grinding chamber 23 at the area 15 thereof where the part of the grinding chamber 23 that overhangs the mixing chamber 40 meets with the remainder of the grinding chamber 23 (FIG. 5). The walls 11a, 11b and 11c of the mixing chamber have a stepped configuration with lower wall portions 40a, 40b and 40c thereof protruding in the direction of the interior of the mixing chamber relative to upper wall portions 41a, 41b and 41c.

The cover 47 (FIGS. 1 and 8) of the mixing compartment 41 comprises a body with an upper surface 48, lower base surface 50 and side surface 52 having a stepped configuration corresponding to that of the walls 11a, 11b and 11c of the mixing chamber 40, with lower surface portions 54, upper surface portions 56 and step surface portions 58 therebetween.

The cover 47 has a distal end 47a and a proximal end 47b formed with a recess 49 (FIG. 8) so as to accurately fit the shape of the exterior surface 24 of the grinding chamber 23 at its area 20 (FIG. 5) extending between the areas of merger thereof with the edges of the mixing chamber 40.

As shown in FIG. 8, the body of the cover 47 can be formed at its lower base surface with one or more support recesses 51 and support ribs 53 that can be used, if desired, as auxiliary storage compartments for storing, for example, filter tips (not shown), in which case they can be provided with corresponding covers (not shown).

It should be noted that in FIG. 6 it is shown an alternative configuration in which a cover 47' is a sliding cover and is shown in a position that the mixing chamber is slightly open for controlled pouring of ground herbs therefrom.

When not used for mixing, the mixing compartment 41 itself can also be used for storage, for example, a lighter and or filter tips (not shown).

The storage compartment 61 (best seen in FIGS. 2, 3, 5 and 7) is in the form of a longitudinal slot 67 (FIG. 5) with a bottom surface 15 and bracket-like slot walls 63 and 65, having a configuration suitable for slidingly receiving therein receiving therein a flat package P of rolling paper sheets. For this purpose, the slot 67 can have the following dimensions: a length $l_s$ (FIGS. 3 and 7) of the bottom surface 15, a width $w_s$ of the slot 67, and a height $h_s$ (FIG. 5), all corresponding to respective dimensions of a standard flat package P of rolling paper sheets (shown in FIGS. 1 and 2) so as to allow the package P, when received within the slot 67, to be securely supported by bracket portions 62 and 64 of the slot walls 63 and 65 and the bottom surface 15 so as to be tightly fitted within the slot 67, however being easily removable therefrom by a user.

The length of the bottom surface 15 can generally be shorter than the length of the package P and the width of the slot can generally be greater than that of the package P (as seen in FIG. 2) as long as the package can still be held tightly in the slot 67.

The length $l_s$ of the storage compartment can be in the range 60 mm to 90 mm, and more specifically 70 mm to 110 mm, and in particular can be such as to suit standard packages of length 70 mm, 80 mm and 110 mm.

The width $w_s$ of the storage compartment can be in the range 40 mm to 50 mm, and more specifically about 45 mm, and in particular can be such as to suit standard packages of width 44 mm.

The package of the rolling paper sheets P can be removed from the storage compartment 61 by pulling thereof out of the storage compartment 61 in a direction of the longitudinal axis $A_H$ of the housing. Moreover, the package P of a rolling paper can have at its face a package slot S (FIG. 3) via which sheets of the rolling paper can be withdrawn from the package one by one, the package can be inserted in the slot 67 of the storage compartment 61 so that the package slot faces away from the bottom surface 15 of the grinder body 11 and is disposed between the slot walls 63 and 65. This can allow withdrawal of the rolling paper from the package P without removal of the package from the storage compartment 61.

Alternatively, the storage compartment 61 can be in the form of a storage chamber of any desired shape coverable by a cover of a corresponding shape (not shown) which can be a separate element of rotationally attached to the body 11 so as to open and close the storage compartment.

With reference to FIGS. 10A to 13, there is shown another configuration of a herb grinder, designated 70, which is similar to the herb grinder 10 described above, and which will be described below mainly with respect to its special features not present in the herb grinder 10. However, it should be noted that any of these features of the herb grinder 70 can be used in the herb grinder 10 and any vice versa.

The herb grinder 70 comprises a grinding compartment including a grinding chamber 81 and a grinding cover 83. The cover 83 comprises a grip 85 and an opening to an internal passage 87 (FIG. 11), for the insertion therein of a cleaning stick T (FIGS. 10A and 10B) for cleaning the areas between the grinding teeth.

The herb grinder 70 further comprises a mixing compartment 80 including a mixing chamber 78 and a mixing cover 91. Side walls 83 of the mixing chamber 78 have their edges in the form of positioning ribs 74 configured to be received within corresponding recesses in side walls 96 of the cover 91 (FIG. 13), thereby allowing to slidingly insert the cover at the top of the mixing chamber. In addition, the cover 91 is formed with ribs 93 at its bottom surface 92 (FIG. 13) for fitting to the corresponding positioning recesses 95 (FIG. 10B) disposed adjacent the grinding portion 81 at the edges 77 of the housing 71.

The cover 91 is also formed with end protrusion 97 (FIGS. 10C and 13) shaped so as to fit within the corresponding end recess 75 (FIG. 10C) of the housing 71, which facilitates allows the use to manipulate with the movement of the cover along the length of the mixing chamber 78. In particular, when the use wishes to completely cover the mixing chamber and make sure that the ribs enter the corresponding recesses, the user can push the cover inwardly by pressing on the protrusion 97. On the other hand, when the use wishes to at least partially remove the cover, he can do this by grasping the protrusion 97 and pulling it outwardly to a desired extent, as e.g. shown in FIGS. 10B and 10C.

In addition, the recess 75 is used for pouring therefrom the mixed herbs. For such purpose the cover 91 can gradually expose the recess 75 to the desired extent depending on the amount of grinded herbs to be poured. Such arrangement allows pouring the grinded herbs without removing the cover 91.

Figure 12:
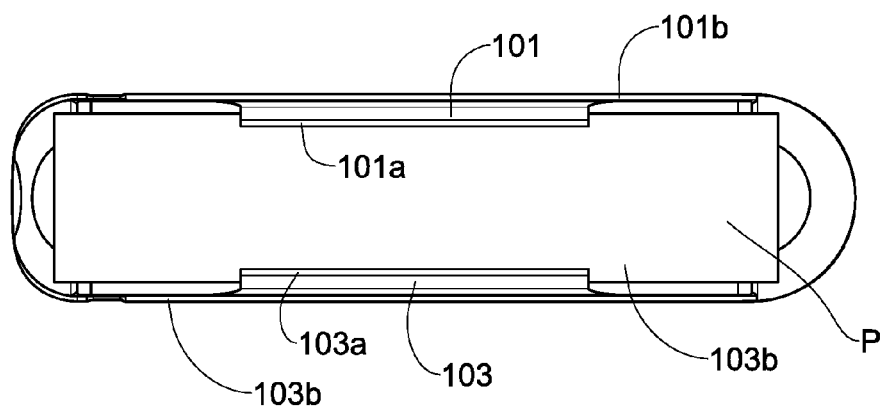
FIG. 12 is a bottom view of the herb grinder of FIGS. 10A to 10C.
Figure 13:
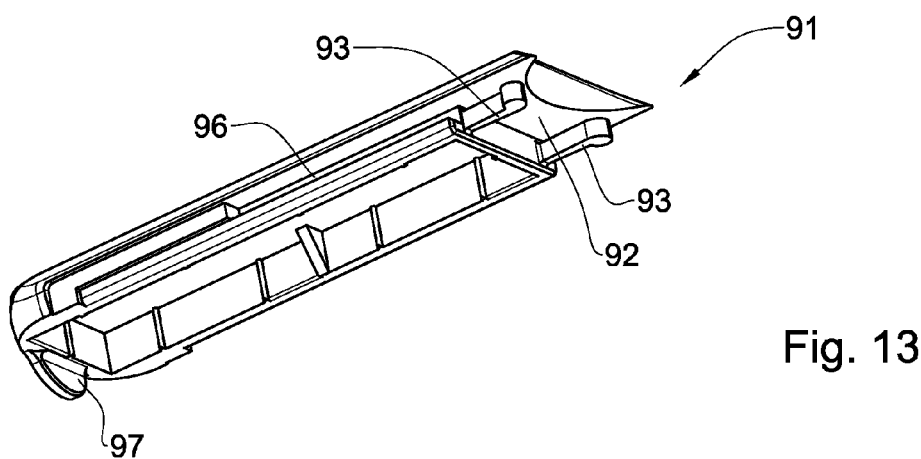
FIG. 13 is a bottom perspective view of the cover of the mixing compartment of the herb grinder of FIGS. 10A to 10C.

As shown in FIGS. 10C and 12, the bracket-like slot walls 101 and 103 of the herb grinder 70 have a slightly different design than the brackets 63 and 65 of the herb grinder 10, tapering away from a slot bottom surface 115 so that the bracket portions 101a and 103a disposed further from the bottom surface 115 are shorter than the bracket portions 101b and 103b disposed adjacent the bottom surface 115 (FIGS. 10C and 12).

Figure 14:
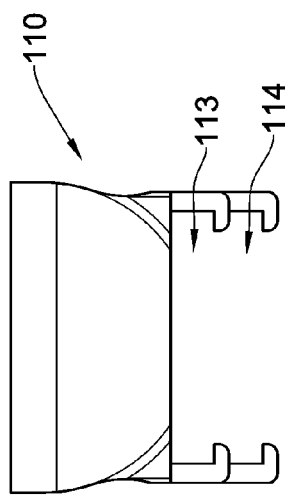
FIG. 14 is a front end view of an herb grinder in accordance with another example of the presently disclosed subject matter, shown without a cover of its grinding compartment and without an accessory, which can be disposed in its storage compartment.

The storage compartment can be shaped and sized so as to receive more than one package P. In particular, the storage compartment can comprise a plurality of slots, each extending parallel to the bottom surface 115 and configured for receiving a package of rolling paper sheets therein. FIG. 14 shows one example of such configuration, in which a herb grinder 110 comprises two slots 111 and 113 for receiving packages of rolling paper therein.

Figure 15:
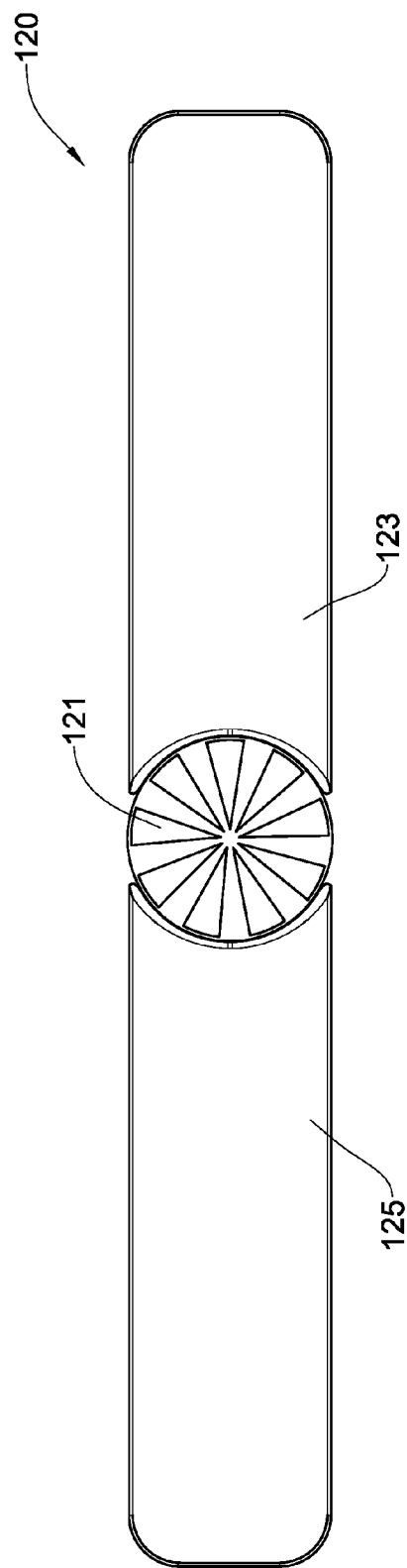
FIG. 15 is a top view of an herb grinder in accordance with another example of the presently disclosed subject matter.

FIG. 15 shows another configuration of a herb grinder 120, in which compartment 121 is disposed between two body portions 123 and 125, each of which is similar to the body of the herb grinder 10 or 70 described above.

Turning now to FIGS. 16 to 25, there is shown a cylindrical-type herb grinder designated as 200 configured for carrying therein a cylindrical package R of a rolling paper.

Figure 19:
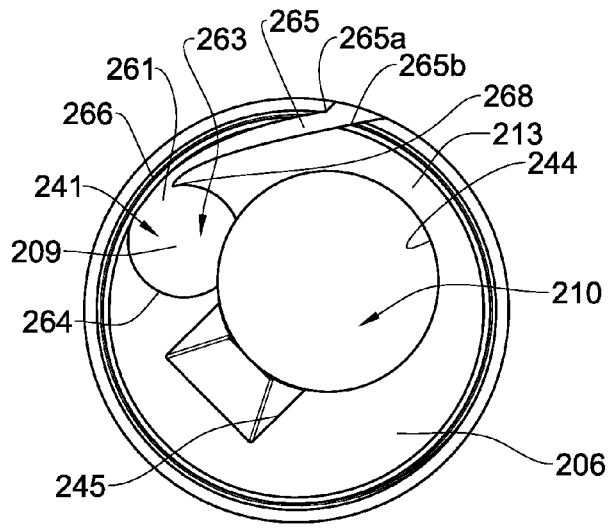
FIG. 19 is a top view of the herb grinder of FIG. 17A.

The herb grinder 200 comprises a grinder body 211 having a longitudinal axis $A_1$, and extending therealong between two flanges 203 and 205, the former being hereinafter referred to as a 'storage flange' and the latter—as a 'grinding flange'. The grinder body 211 comprises a grinding chamber 211 at its grinding flange, and an interior accessible from the storage flange 203 and constituted by a number of interior hollow cavities configured to serve as storage chambers. The storage chambers of the herb grinder 200 include a rolling paper storage chamber 209 and a lighter storage chamber 210 (FIG. 19). However, it should be noted that the interior of the grinder body 211 can be formed, instead or in addition to the lighter storage chamber, with one or more additional rolling paper storage chambers or filter tips storage chamber/s.

The storage flange 205 of the grinder body 211 has a storage flange face 213 (FIG. 21B) and a cylindrical flange side wall 214 extending outwardly therefrom.

The grinder body 211 further has an exterior surface 202, an interior body portion 206 (FIG. 17B) extending between the storage flange face 213 and an interior partition wall (not designated) and surrounding the rolling paper storage chamber 209 and the lighter storage chamber 210. The partition wall has an interior bottom surface 216 (FIG. 17B) constituting the bottom of the interior hollow cavities and seen therethrough from the storage flange of the grinder body 211 (FIG. 19), and an outer surface 215 (FIG. 18) facing in the direction away from the interior body portion.

Figure 18:
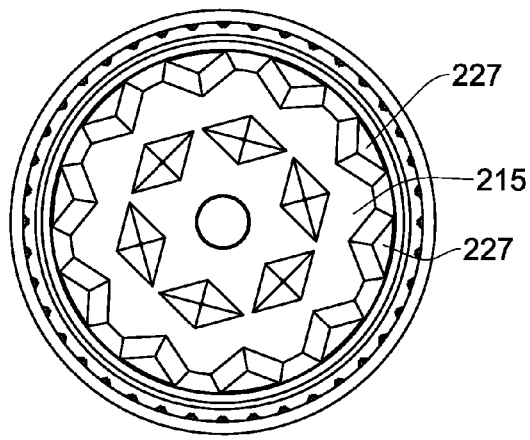
FIG. 18 is a bottom view of the herb grinder of FIG. 17A.

The grinding chamber 221 of the herb grinder 200 comprises a teeth portion 222 (FIG. 17) the surface of which constitutes outer surface 215 of the partition wall of the grinder body 211(Fig. 18). The teeth portion 222 comprises a plurality of spatially arranged grinding teeth 227 extending outwardly from the exterior bottom surface 215 and substantially perpendicular thereto.

The herb grinder 200 further comprises a grinding cover 232 (FIGS. 22 and 23) having a grinding face 235 and a pouring face 234. The grinding cover 232 is configured to be rotatably attached at its grinding face 235 to the teeth portion 222 to form therewith a grinding assembly, and comprises on the grinding face 235 a plurality of spatially arranged grinding teeth 237 extending substantially perpendicular to its grinding face 235, so that when the teeth element 232 is attached to the teeth portion 222 the teeth 237 face the teeth 227 and fill the spaces therebetween, similarly to the herb grinder 10 described above.

The grinding cover 232 comprises a plurality of openings 239 disposed at the spaces between the teeth 237 and extending between the grinding and pouring faces.

The herb grinder 200 further comprises a bowl-like cap 270 (shown separately in FIGS. 21A to 21C) configured for being fitted over the grinding cover 232, to function as a collecting and mixing bowl for the grinding assembly, and over the storage flange to form with the interior of the grinder body 211 a storage assembly. More particularly, the cap 270 can be screwed to the grinding cover at its pouring face 234 and to the cylindrical side wall of the storage flange.

Alternatively, the herb grinder can have two caps, one performing the former and the other performing the latter of the above functions.

The above arrangement is such that the herbs to be ground are placed between the surfaces 215 and 235, the teeth element 232 is rotated against the teeth portion 222 by a user, the herbs are ground between the teeth 227 and 237 and the ground herbs pour through the openings 229 into the cap 270. After the cap 270 is emptied from the ground herbs the cap 270 can be returned to its place over the top of the grinder body 211.

Reverting to lighter and rolling paper storage chambers, as mentioned above, they are constituted, respectively, by the first interior cavity 243 and the second interior cavity 263 (FIGS. 17A and 17B), both extending longitudinally between a storage flange surface 213 and the interior bottom surface 216, parallel to the longitudinal axis $A_1$ of the grinder body 211 grinder body 211.

The first interior cavity 243 is shaped so as to be able to receive therein any lighter having suitable dimensions and shape, through a first receiving opening 241 (FIG. 19) on the flange 213 of the grinder body 211.

Figure 20A:
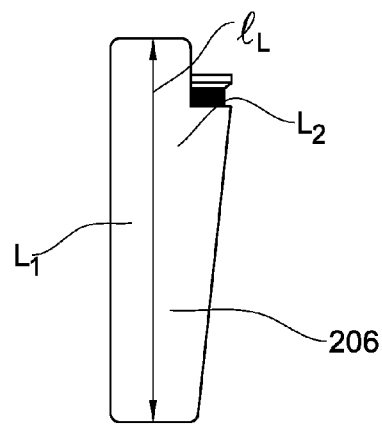
FIG. 20A schematically shows an example of a lighter that can be received within the herb grinder of FIG. 16A.
Figure 25:
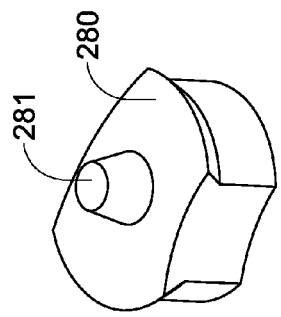
FIGS. 25, 26A and 26B show different examples of a roll cap, which can be used in the herb grinder of FIG. 16A.

For example, the first interior cavity 243 can comprise a body portion 244 and a tapering ignition portion 245 so that when a lighter L (FIG. 20A) is received within the first interior cavity 243, its corresponding portions $L_1$ and $L_2$ are fitted within the body portion 244 and the ignition portion 245, respectively (FIG. 20B).

For the illustration purposes only, the lighter L shown in FIG. 20A has a shape of a known Clipper® lighter, in accordance with which the interior cavity 243 is configured. However, the interior cavity can be of a simple cylindrical shape so as to receive therein any lighter or can be designed to have any other desired shape.

A length $l_1$ (FIG. 17C) of the first interior cavity 243 can be shorter than the length $l_L$ of the lighter L to allow the latter, when the lighter is received within the first interior cavity 243, to partially project from the flange 213 of the grinder body 211, as shown in FIG. 20B.

The second interior cavity 263 can merge with the first interior cavity as shown (FIG. 17A) or they can be completely separated one from the other (not shown).

The second interior cavity 263 comprises a roll receiving portion 264 of a substantially cylindrical shape and of a length 12 (FIG. 16C) defined by a length $L_R$ of a rolling paper roll R (FIG. 20C) to be received therein via a second receiving opening 261 on the storage flange face 213 of the grinder body 211, and a longitudinal withdrawal slot 265 (FIGS. 16C, 17A, 17B and 19), which extends from the roll receiving portion 264 through the exterior surface 202 of the grinder body 211 along the entire length $L_2$ of the roll receiving portion 264. The slot 265 has a first wall 265a orientated tangentially with respect to the interior cavity 263 at the area 266 of their merger, and a second wall 265b defining with the interior cavity 263 an acute angle at the area 286 of their merger (FIG. 19). The length $L_2$ of the roll receiving portion 264 can be slightly greater than the length $L_R$ of the roll R.

The arrangement is such that when the roll R is received within the second internal cavity 263, an free end $R_1$ of the rolling paper is placed within the roll slot 265 so that it is partially protrudes from the exterior surface 202 of the grinder body 211 and can be easily accessible by a user and for pulling the rolling paper out of the roll R through the withdrawal slot 265.

Figure 16C:
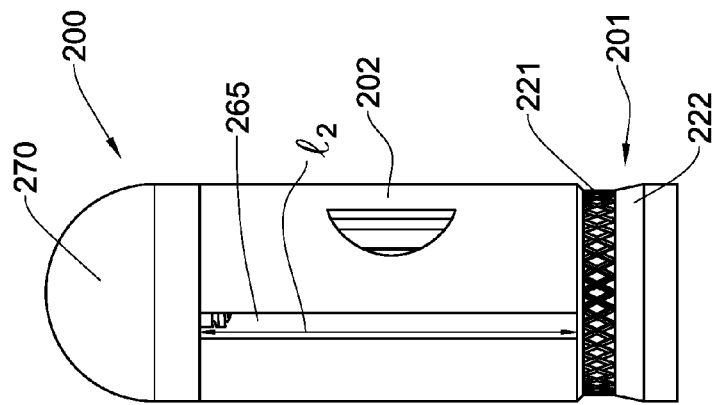
FIGS. 16B and 16C are front and rear views, respectively, of the herb grinder of FIG. 16A.
Figure 16B:
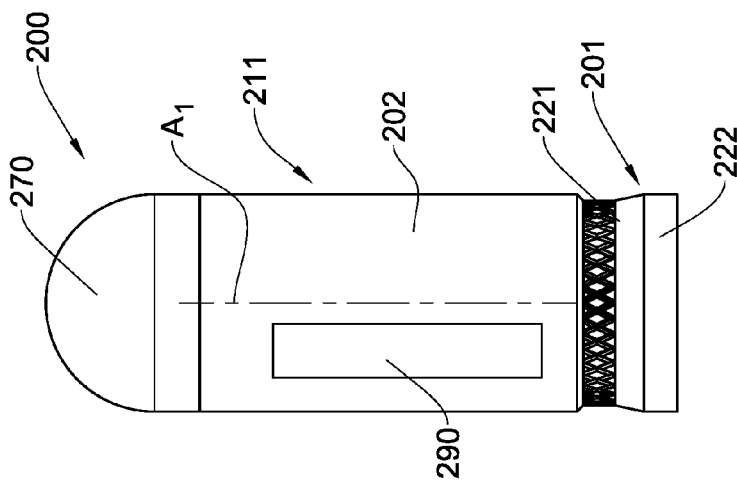
Figure 16A:
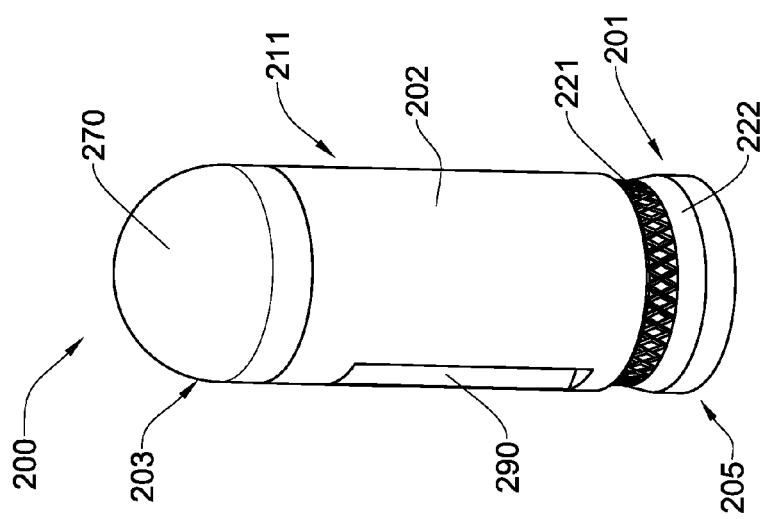
FIG. 16A is a side perspective view of an herb grinder in accordance with another example of the presently disclosed subject matter.
Figures 17A, 17B, 17C:
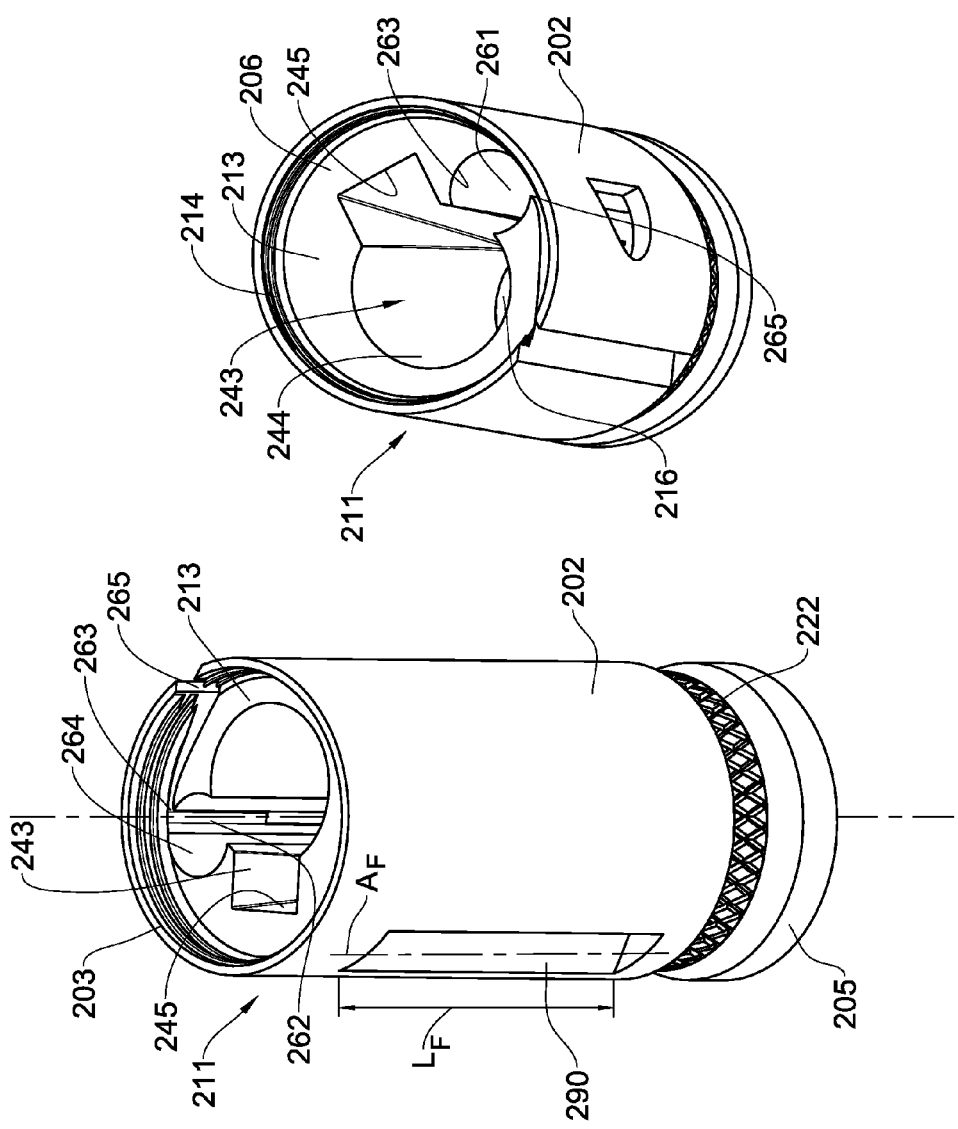
FIG. 17A is a side perspective view of the herb grinder of FIG. 16A, with its cap and teeth element removed.
FIG. 17B is a top perspective view of the herb grinder of FIG. 17A.
FIG. 17C cross-sectional view of the herb grinder of 17A, taken along the line A-A.

To facilitate the moving the free end $R_1$ of the rolling paper along the withdrawal slot 265, towards the exterior surface 202, the grinder body 211 further comprises a wall cut 250 (FIG. 20C) extending between the exterior surface 202 and the withdrawal slot 265, allowing a finger access to the free end $R_1$ within the withdrawal slot 265 (FIG. 16C).

The roll receiving portion 264 can be fitted with a roll cap 280 (FIGS. 24 and 25) configured to be received within the receiving opening 261 and covering the roll R. The cap 280 comprises a grip 281 and can be made of a resilient material, such as rubber.

The roll cap 280 can be shaped so that, when it is placed within the opening 261 it partially protrudes through an area 262 of merger between the first interior cavity 243 and the second interior cavity 263 and thus contacts the lighter L received within the first interior cavity 243, and prevents it from free movement within the cavity 243.

Figure 26A:
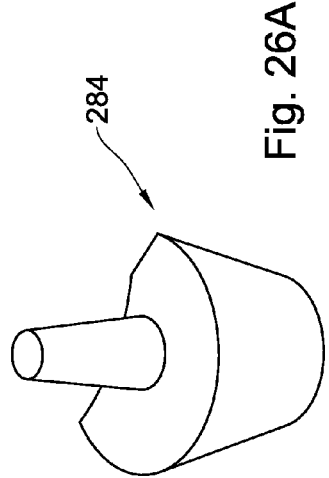
Figure 26B:
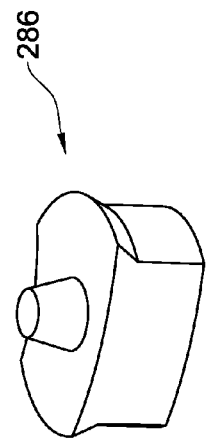
Figure 24:
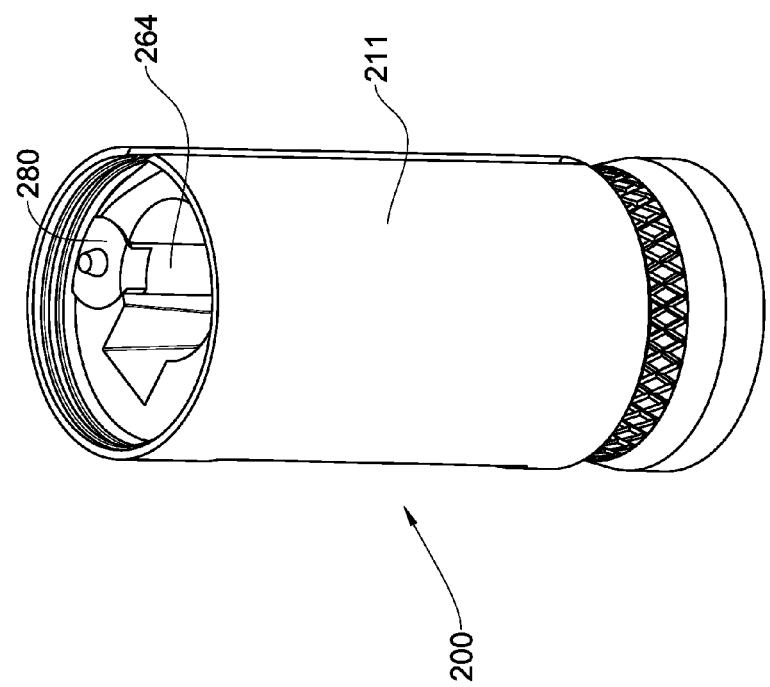
FIG. 24 is a side perspective view of the herb grinder of FIG. 16A with a roll cap covering one of interior cavities thereof.
Figure 32B:
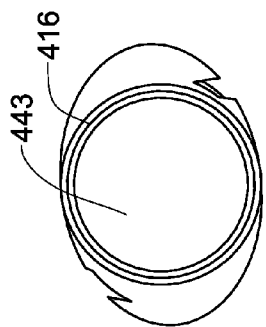
FIGS. 32A and 32B are top and bottom views, respectively, of the second body of FIG. 31.
Figure 35:
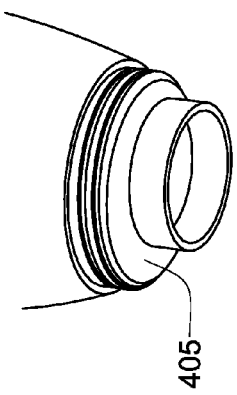
FIG. 35 shows an enlarged bottom portion of the first body of FIG. 34.
Figure 32A:
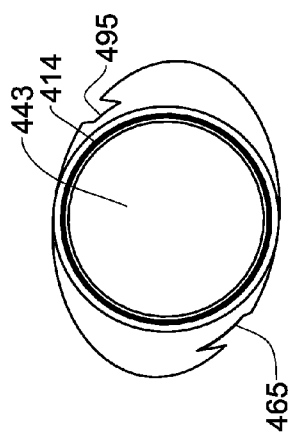
Figure 34:
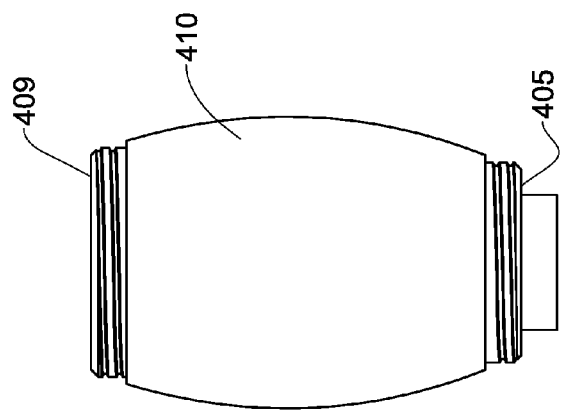
FIG. 34 is a side view of a first body of a housing assembly of the herb grinder of FIG. 29.
Figure 31:
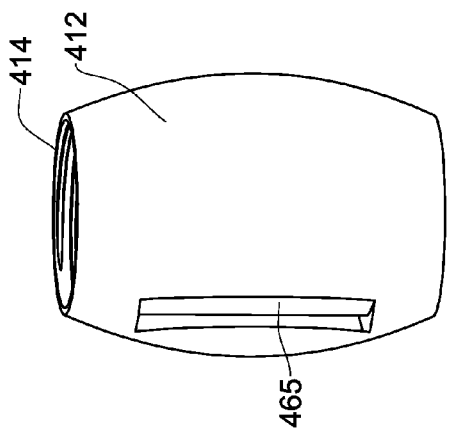
FIG. 31 is a side view of a second body of a housing assembly of the herb grinder of FIG. 29.
Figure 33:
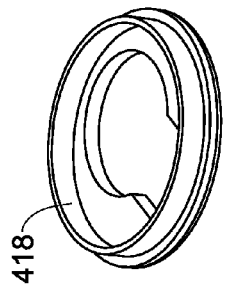
FIG. 33 is a perspective view of a cover of the second body of FIG. 31.
Figure 39:
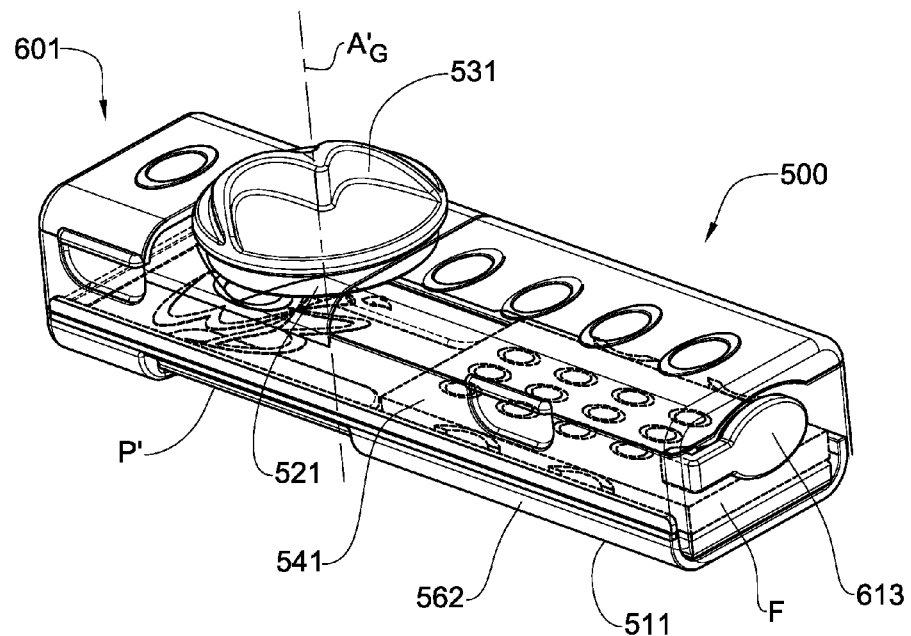
FIG. 39 shows a herb grinder in accordance with another example of the presently disclosed subject matter, presented as transparent to show an accessory P and an accessory T disposed in its storage compartment.
Figure 40A:
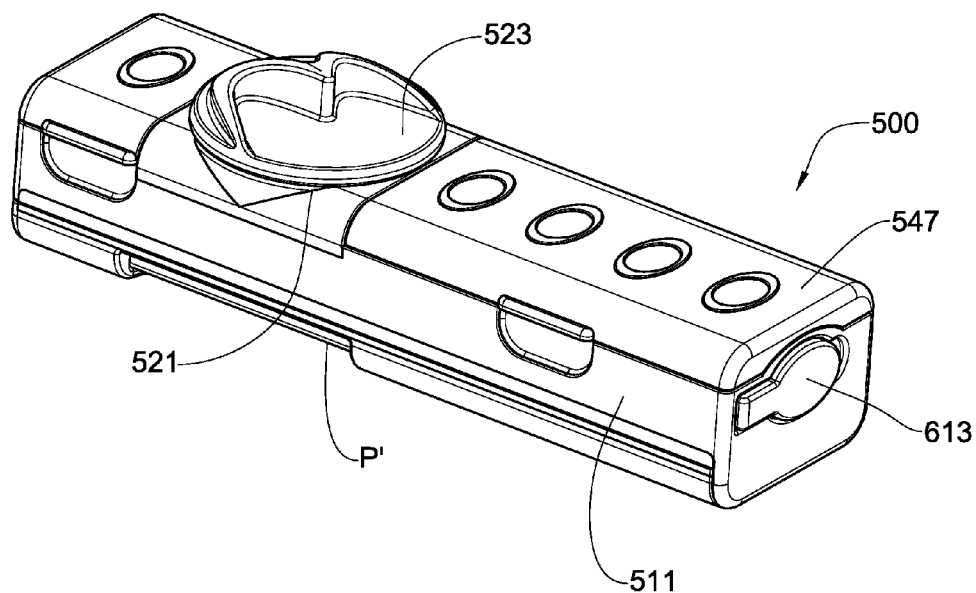
FIG. 40A is a perspective view of the herb grinder of FIG. 39.
Figure 40D:
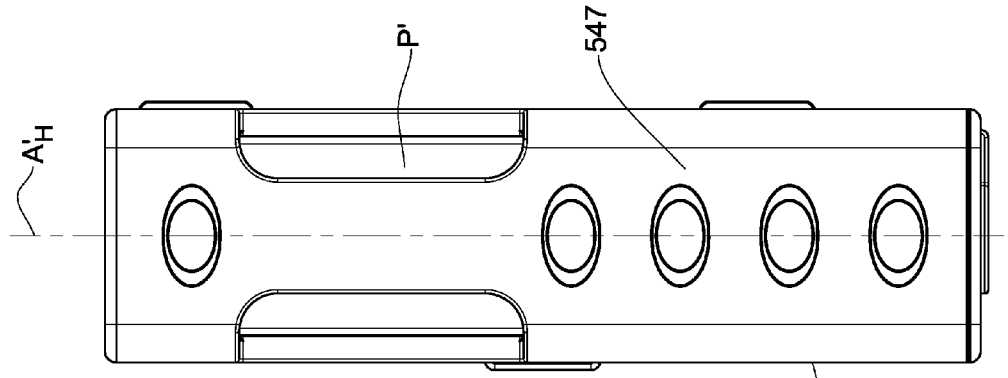
FIG. 40D is a top view of the herb grinder of FIG. 39.
Figure 40B:
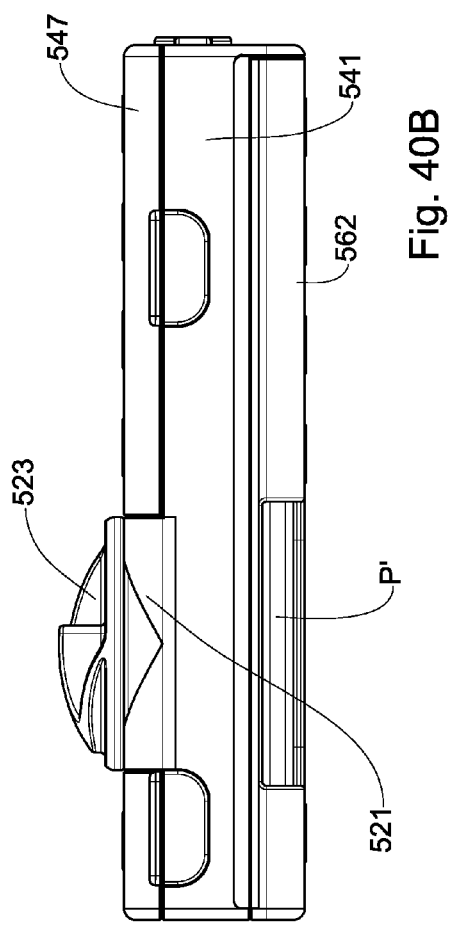
FIG. 40B is front view of the herb grinder of FIG. 39.
Figure 40C:
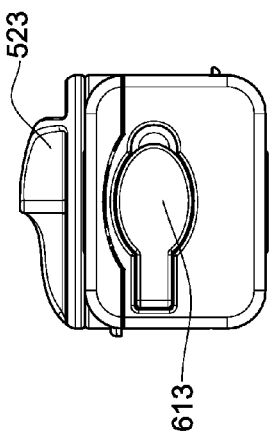
FIG. 40C is a side view of the herb grinder of FIG. 39.

Other examples of different shapes of roll caps 284 and 286 are shown in FIGS. 26A and 26B.

The herb grinder 200 can further comprise an external storage compartment formed in the grinder body 211 and accessible from the exterior surface 202, e.g. for storing filter tips. This compartment can have any suitable shape and orientation and can, for example, be in the form of a longitudinal pocket 290 (FIGS. 16A, 16B, 17A and 20D) extending along an axis $A_F$ parallel to the axis $A_1$ of the grinder body 211 on the exterior surface 202 thereof.

Filter tips F (FIG. 20D) can be arranged as a booklet with a length $l_F$ and a width $w_F$ (schematically shown in FIG. 20D), and the pocket 290 can thus be configured for receiving such booklet therein.

With reference to FIGS. 27 and 28, there is shown another example of a cylindrical-type herb grinder generally designated 300, according to the presently disclosed subject matter. The herb grinder 300 is substantially similar to the herb grinder 200, except for the design of its grinding assembly 321.

The grinding assembly 321 of the herb grinder 300 comprises a teeth portion 322 (not seen) with grinding teeth 327 similar to the teeth portion 222 of the herb grinder 200 and a teeth element 332 with grinding teeth 337, configured to be rotatably attached to the teeth portion 322 so as to grind herbs as described above with reference to the grinding assembly 221. However, unlike the teeth element 232, the teeth element 332 serves both for grinding and for collecting the ground herbs within its interior space 333.

Such an arrangement eliminates the need in additional element, such as the cap 270 of the herb grinder 200, to be attached to the bottom of the housing to collect the ground herbs.

It should be appreciated that the grinder 200 can comprise in additional or an alternative access to the storage compartment, such as for example a longitudinal door-like cover, extending along the axis $A_1$ configured for opening and closing the storage compartment or at least one cavity thereof by rotating about an axis parallel to the axis $A_1$.

Referring now to FIGS. 29 to 38, there is shown a cylindrical-type herb grinder generally designated 400, in accordance with another example of the presently disclosed subject matter, having several features similar to those disclosed in connection with previous examples, in particular the herb grinders 200 and 300. For the sake of clarity, like reference numerals have been designated as in FIGS. 16A to 26B, however shifted by 200.

The herb grinder 400 comprises a housing assembly 411 composed of a first body 410 having a first longitudinal axis A' and a second body 412 having a second longitudinal axis A", so that when assembled (FIG. 29), the first body 410 and the second body 412 are coaxial.

The herb grinder 400 further comprises a teeth element 432 (FIGS. 30, 37A and 37B) with grinding teeth 437 and openings 439, similar to the teeth element 232 (FIG. 22) of the herb grinder 200 and a cap 470 (FIG. 30) having grinding teeth 427 (FIG. 38), both constituting together with the first body 410 a grinding assembly 421

The first body 410 (shown separately in FIGS. 34 and 36) is a hollow substantially cylindrical element having a top opening 409 to which the teeth element 432 is configured to be screwingly attached, an interior bottom base 407 (FIG. 36), a collecting and mixing cavity 403 (FIGS. 30 and 36) and an exterior bottom base 405 (FIG. 35) configured to be screwingly attached to the second body 412.

When the grinding assembly 421 is in use, the herbs to be ground are placed between the teeth element 432 and the cap 470, so that upon rotation of the cap 470 with respect to the teeth element 432 the herbs are ground and poured through the openings 439 into the collecting and mixing cavity 403 of the first body 410.

The grinding assembly 421 can be used separately from the second body 412 and, if necessary, the collecting and mixing cavity can be also used for storing accessories.

The second body 412 (FIGS. 31 to 33) is a hollow cylindrical element configured to be screwingly attached at its top opening 414 to the exterior bottom base 405 of the first body 410 and fitted with a cover 418 (FIG. 33) at its bottom opening 416.

The second body 412 constitutes a storage compartment of the herb grinder 400, comprising a storing cavity 443, a roll slot 465 (FIG. 30) and a filter tips slot 490 (FIGS. 29 and 31), similar to the corresponding slots of the herb grinder 200. Similar to the second interior cavity 263 of the herb grinder 200, a length of the storing cavity 443 is defined by the length of the rolling paper roll to be stored therein.

When in use, the storage compartment can accommodate at least one of the following: a lighter, a rolling paper roll (which can be pulled out from the roll slot 465) and a booklet of filter tips within the slot 490.

Referring now to FIGS. 39 to 42, there is shown another example of a herb grinder 500 according with the presently disclosed subject matter.

The herb grinder 510 comprises a longitudinal body 511 which has a longitudinal axis $A'_H$ (FIG. 40D) and comprising: a grinding chamber 523 (FIG. 41), which when covered by a corresponding cover 531 forms a grinding compartment 521; a mixing chamber 540 (FIG. 41), which when covered by a corresponding cover 547 forms a mixing compartment 541, and a first storage compartment 561 (FIG. 42) disposed at the opposite side of the mixing chamber 540 opposite the cover 547 and a second storage compartment 601 disposed adjacent the grinding compartment 521 opposite the mixing compartment 541.

The mixing compartment 541 and the first storage compartment 561 extend along the axis $A'_H$, which is perpendicular to the axis $N_G$ of the grinder, similar to the arrangement of the grinders 10 and 70.

It should be emphasized that in the grinder 500, similarly to the grinders 10 and 70, the mixing compartment 541 extends laterally with respect to the grinding compartment 521, so that the grinder has to be slightly tilted to allow the grinded herbs to accommodate the mixing compartment to be mixed therein.

The grinding chamber 523, the mixing chamber 540 and the storage compartments 561 and 601 can all be formed as a unitary body or rather can be in the form of separately manufactured components integrally assembled together.

The grinding compartment 521 comprises the grinding chamber 523 formed with a plurality of grinding teeth 527 and the cover 531 formed with a plurality of grinding teeth 537 (not seen), and operates substantially similar to the grinding compartment 21 of the herb grinder 10 and of the herb grinder 70.

The mixing chamber 540 extends along the majority of the grinder body 511 and the mixing chamber cover 547 is configured to be fitted at the top of the mixing chamber 540 constituting together a closed mixing compartment 541, substantially similar to the mixing compartment 41 of the herb grinder 10, with main difference being in the structure of the cover 547.

The above arrangement allows the herbs poured from the grinding compartment to be collected in the space below the grinding compartment 521, i.e. a collecting compartment, and pass directly to the mixing chamber 540.

Figure 41:
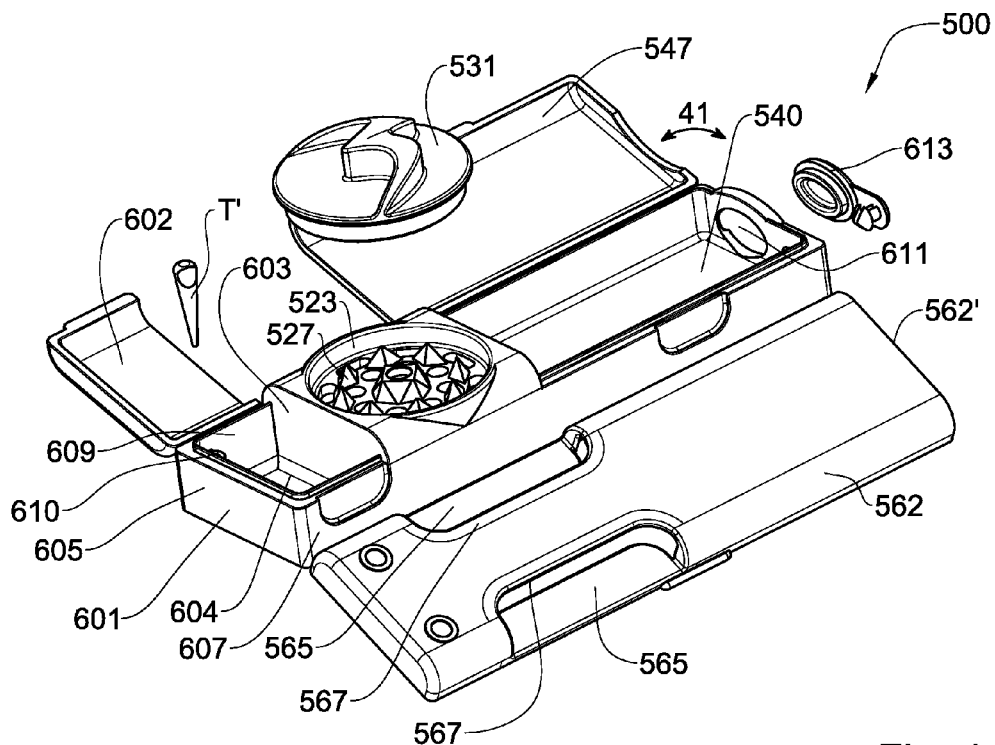
FIG. 41 is a top perspective exploded view of the herb grinder of FIG. 39, showed without the accessories P and T, with all its cover in their open positions.

The cover 547 is a door-like element attached to the grinder body 511 and configured to be rotated about the axis of its attachment between a closed position (FIGS. 39 to 40D) and an open position (FIGS. 41 and 42) with respect to the mixing chamber 540 as shown by an arrow b in FIG. 41.

The mixing compartment 541 terminates with an end opening 611 and a corresponding end closure 613 (best seen in FIGS. 41 and 42), for pouring therefrom the grinded mixed herbs ready for use, without opening the whole mixing compartment.

As indicated above, the herb grinder 500 further comprises and a first storage compartment 561 and a second storage compartment 601.

The first storage compartment 561 (best seen in FIG. 42) is a bottom portion 560 of the grinder body 511, and it comprises a recessed chamber 563 extending along a portion of the bottom portion 560 and a door-like cover 562 formed with a slot 567 extending therealong. The cover 562 is attached to the herb body 511 so as to rotate about the axis of its attachment between a closed position (FIGS. 39 to 40D) and an open position (FIGS. 41 and 42) as shown by an arrow c in FIG. 42 to open and close the bottom portion 560.

The slot 567 is configured for receiving therein a flat package P' of rolling paper sheets (FIGS. 39 to 40D), and is sized accordingly, similarly to the slot 67 of the herb grinder 10. For this purpose, the door-like cover 562 has an open end 562' (FIGS. 41 and 42) for inserting the package P' into the slot 567.

The door-like cover 562 further comprises a pair of supporting ribs 565 extending inwardly and perpendicularly with respect to edges 566 of the cover 565, so as to support the package P' of the rolling paper sheets.

The door-like cover 562 is further formed with a pair of openings 567 allowing a finger access to the package P so as to push it out from the first storage compartment 561 without opening the door-like cover 562.

The recessed chamber 563 is configured for receiving therein a package of filter tips F. For this purpose side walls 529 of the recessed chamber 563 are formed with supporting projections 533 for firmly hold the filter tips F (seen through the transparent body in FIG. 39) within the recess 563.

The second storage compartment 601 comprises a chamber 604 formed between a first side wall 603 (FIGS. 1 and 41) separating it from the mixing chamber, a second side wall 605 which is an end wall of the grinder body 511 and two additional walls 607 and 609 between the first and second side walls.

Figure 42:
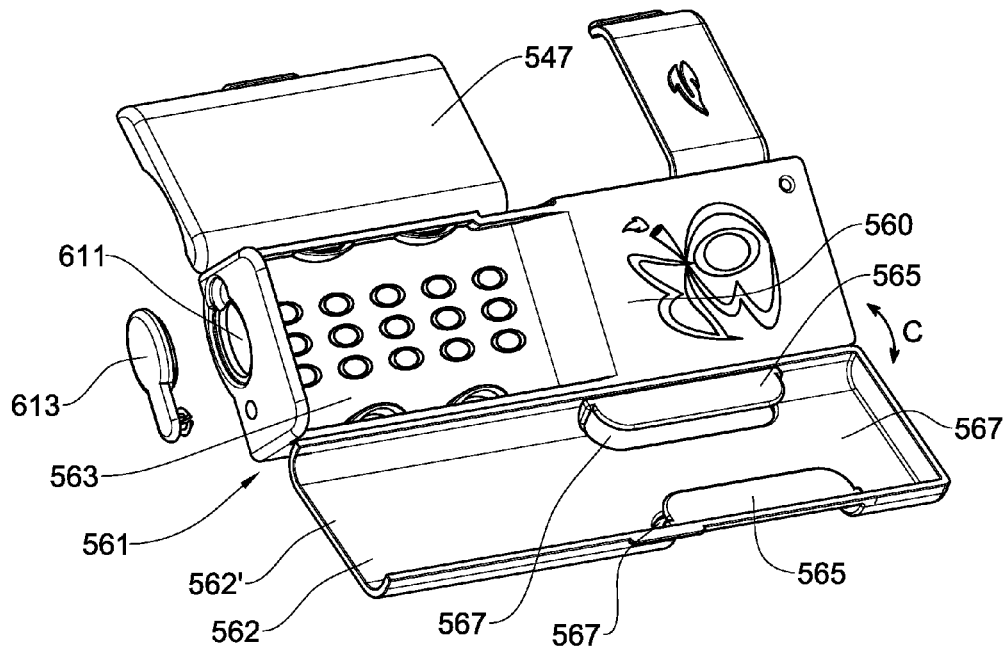
FIG. 42 is a bottom perspective exploded view of the herb grinder of FIG. 39, showed without the accessories P and T, with all its cover in their open positions

The second storage compartment 601 comprises a cover 602 rotatingly attached thereto between a closed position (FIGS. 39 to 40D) and an open position (FIGS. 41 and 42).

The second storage compartment 601 can be used to store herbs to be grinded.

The cover 602 is further configured for accommodating a cleaning stick T' (FIG. 41) within a corresponding storage pocket 610.

Those skilled in the art to which this invention pertains will readily appreciate that numerous changes, variations, and modifications can be made without departing from the scope of the invention, Mutatis Mutandis.

The invention claimed is:

1. A herb grinder having a longitudinal dimension, the herb grinder comprising:
    a grinding assembly having a grinding compartment for grinding herbs placed therein, the grinding compartment having a central axis; and
    a longitudinal storage compartment different from said grinding compartment, the longitudinal storage compartment having a longitudinal axis substantially perpendicular to the central axis of said grinding compartment and extending along the longitudinal dimension of the grinder along a substantially constant length, which is greater than that of the grinding compartment and which is such as to allow the storage compartment to store therein an accessory of a corresponding length, other than said herbs before or after the grinding.

2. The herb grinder according to claim 1, wherein said accessory is a package of a rolling paper.

3. The herb grinder according to claim 2, further comprising an additional storage compartment configured for storing at least one accessory other than the rolling paper.

4. The herb grinder according to claim 3, wherein the additional storage compartment is configured for storing at least one of filter tips or a lighter.

5. The herb grinder according to claim 1, wherein the longitudinal storage compartment extends along at least a part of the extension of the grinding compartment along said longitudinal axis.

6. The herb grinder according to claim 1, wherein the longitudinal storage compartment extends along a majority of the longitudinal dimension of the herb grinder.

7. The herb grinder according to claim 1, wherein the longitudinal storage compartment forms an integral body with at least a portion of the grinding assembly.

8. The herb grinder according to claim 1, wherein the longitudinal storage compartment and the grinding compartment share a common base.

9. The herb grinder according to claim 1, further comprising a cover configured for covering a portion thereof.

10. The herb grinder according to claim 9, wherein the cover is configured for storing at least one accessory therein.

11. The herb grinder according to claim 9, wherein the cover comprises said longitudinal storage compartment.

12. The herb grinder according to claim 1, further comprising a mixing compartment for mixing at least herbs ground in the grinding compartment, wherein the grinding compartment and the mixing compartment share a common base.

13. The herb grinder according to claim 1, further comprising a collecting chamber which constitutes a part of said longitudinal compartment.

14. A herb grinder, comprising:
- a grinding assembly having at least a grinding compartment for grinding herbs placed therein;
- a rolling paper storage compartment different from said grinding compartment and comprising a longitudinal hollow cavity configured to hold therein a roll of rolling paper having a free end; and
- a longitudinal slot extending along said cavity and connecting an interior of the hollow cavity with an exterior thereof exposed to a user so as to allow a free end of the rolling paper to pass through and project outwardly from the longitudinal slot, allowing removal of a desired amount of rolling paper by the user.

15. The herb grinder according to claim 14, further comprising a cover configured for both covering said storage compartment and said grinding compartment for forming with at least one of said grinding compartment or said storage compartment a closed mixing compartment for mixing at least herbs ground in the grinding compartment.

16. The herb grinder according to claim 14, further one or more separate accessory sub-compartments.

17. The herb grinder according to claim 14, wherein at least a part of the grinding assembly is detachably attachable to the storage compartment.

18. The herb grinder according to claim 14, wherein the storage compartment forms an integral body with at least a portion of the grinding assembly.

19. The herb grinder according to claim 14, wherein said hollow cavity has a longitudinal axis and the grinding compartment has a central axis that is substantially parallel or substantially coaxial with said longitudinal axis.

20. The herb grinder according to claim 14, wherein the grinder comprises a wall and a secondary slot within said wall configured for storing a plurality of filter tips.

* * * * *